United States Patent
Briglia et al.

(10) Patent No.: US 9,950,274 B2
(45) Date of Patent: Apr. 24, 2018

(54) METHOD AND APPARATUS FOR COOLING A FLOW CONTAINING AT LEAST 35% CARBON DIOXIDE AND MERCURY

(71) Applicant: L'Air Liquide, Societe Anonyme pour l'Etude et l'Exploitation des Procedes Georges Claude, Paris (FR)

(72) Inventors: Alain Briglia, Hangzhou (CN); Arthur Darde, Paris (FR); Ludovic Granados, Puteaux (FR); Mathieu Leclerc, Paris (FR); Frederick Lockwood, Paris (FR); Xavier Traversac, Paris (FR)

(73) Assignee: L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 678 days.

(21) Appl. No.: 14/413,899

(22) PCT Filed: Jul. 12, 2013

(86) PCT No.: PCT/FR2013/051684
§ 371 (c)(1),
(2) Date: Jan. 9, 2015

(87) PCT Pub. No.: WO2014/009675
PCT Pub. Date: Jan. 16, 2014

(65) Prior Publication Data
US 2015/0157957 A1    Jun. 11, 2015

(30) Foreign Application Priority Data

Jul. 13, 2012 (FR) .................... 12 56769

(51) Int. Cl.
*B01D 5/00* (2006.01)
*F25J 5/00* (2006.01)
*F25J 3/02* (2006.01)

(52) U.S. Cl.
CPC .......... *B01D 5/0075* (2013.01); *F25J 3/0223* (2013.01); *F25J 3/0266* (2013.01); *F25J 3/0295* (2013.01); *F25J 5/002* (2013.01); *F25J 5/005* (2013.01); *F25J 2200/02* (2013.01); *F25J 2200/70* (2013.01); *F25J 2205/04* (2013.01); *F25J 2205/20* (2013.01); *F25J 2205/40* (2013.01); *F25J 2205/60* (2013.01); *F25J 2205/66* (2013.01); *F25J 2210/70* (2013.01); *F25J 2215/04* (2013.01); *F25J 2220/80* (2013.01); *F25J 2220/82* (2013.01); *F25J 2220/84* (2013.01); *F25J 2230/30* (2013.01); *F25J 2230/32* (2013.01); *F25J 2230/80* (2013.01); *F25J 2235/80* (2013.01); *F25J 2250/02* (2013.01); *F25J 2280/20* (2013.01); *F25J 2280/40* (2013.01); *F25J 2290/44* (2013.01); *F25J 2290/90* (2013.01); *Y02C 10/12* (2013.01)

(58) Field of Classification Search
CPC .. B01D 5/0075; F25J 2200/02; F25J 2200/70; F25J 2205/04; F25J 2205/20; F25J 2205/40; F25J 2205/60; F25J 2205/66; F25J 2210/70; F25J 2215/04; F25J 2220/80; F25J 2220/82; F25J 2220/84
See application file for complete search history.

(56) References Cited

U.S. PATENT DOCUMENTS

| 4,813,987 | A | | 3/1989 | Chung et al. |
| 5,718,126 | A | * | 2/1998 | Capron ................. F25J 1/0022 62/613 |
| 6,492,040 | B2 | | 12/2002 | Noishiki et al. |
| 2010/0011663 | A1 | | 1/2010 | Coyle |

FOREIGN PATENT DOCUMENTS

FR    2 947 329    1/2010

OTHER PUBLICATIONS

International Search Report for PCT/FR2013/051684, dated Oct. 27, 2014.
Markussen, "All Heat Exchangers Are Not Created Equal," The Process Engineer, Sep. 2004.
Ruehle, et al., "Amoco Hugoton Jayhawk Gas Processing Plant," Proceedings, Annual Convention—Gas Porcessors Association, CPA, US, vol. 77, Jan. 1, 1998. Chapter "Mercury Abatement," p. 270, Figure 1, last phrase, p. 269.
Wilhelm, Mark S., "Risk analysis for operation of aluminum heat exchangers contaminated by mercury," Process Safety Progress, vol. 28, No. 3, Sep. 1, 2009, pp. 259-266.

* cited by examiner

*Primary Examiner* — Renee Robinson
*Assistant Examiner* — Derek N Mueller
(74) *Attorney, Agent, or Firm* — Justin K. Murray

(57) ABSTRACT

In a method for cooling a flow containing at least 35% carbon dioxide and at least 0.2 μg/Nm³ of mercury, the mercury being in liquid and/or gas form, the flow is cooled in a first brazed aluminum plate-fin heat exchanger from a first temperature to a second temperature higher than −38.6° C. to form a cold flow at the second temperature, and the flow cooled to the second temperature is cooled in a second heat exchanger, which is a tube and shell heat exchanger, to a third temperature lower than −38.6° C.

15 Claims, 3 Drawing Sheets

METHOD AND APPARATUS FOR COOLING A FLOW CONTAINING AT LEAST 35% CARBON DIOXIDE AND MERCURY

CROSS REFERENCE TO RELATED APPLICATIONS

This application is a § 371 of International PCT Application PCT/FR2013/051684, filed Jul. 12, 2013, which claims the benefit of FR1256769, filed Jul. 13, 2012, both of which are herein incorporated by reference in their entireties.

TECHNICAL FIELD OF THE INVENTION

The present invention relates to a process and to an apparatus for cooling a flow containing at least 35% carbon dioxide and mercury.

BACKGROUND

The devices involving heat exchanges over gases and liquids at low temperatures (<0° C.) generally require brazed aluminum exchangers in order to benefit from their compactness, lightness and low cost with regard to other solutions that withstand low temperatures (stainless steel in particular).

FR-A-2947329 describes a process for cooling a flow containing at least 35% carbon dioxide and mercury in a first heat exchanger made of stainless steel to a temperature of −30° C. and from −30° C. in a second heat exchanger made of aluminum. The first exchanger is designed to allow the accumulation of mercury and after the first exchanger a purification step makes it possible to reduce or even eliminate the mercury upstream of the second exchanger.

The use of a brazed aluminum heat exchanger following a stainless steel exchanger may prove problematic due to the residual mercury that will solidify therein. The solidification in an aluminum heat exchanger may lead to plugging and ultimately to embrittlement of the aluminum during shutdown phases.

The presence of mercury poses a problem since in the dry phase the liquid mercury amalgamates with aluminum and pierces the exchangers (the well-documented phenomenon of liquid metal embrittlement or LME). This phenomenon is above all linked to the deposits of mercury as indicated in "Risk analysis for operation of aluminum heat exchangers contaminated by mercury" by Wilhelm, Process Safety Progress, vol. 28, no. 3, 2009. It is well known to stop the mercury with the aid of sulfur-doped activated carbon beds, especially in the natural gas liquefaction industry.

This solution is nevertheless expensive and requires frequently changing the adsorbent. The invention presented here aims, inter alia, to reduce the impact of the mercury on the cost of the apparatus.

Furthermore, it is known that certain impurities prohibit the use of such and such an adsorbent or greatly reduce the effectiveness thereof. Thus, the presence of NOx, even in small amounts (a few ppm), makes the use of activated carbon very tricky as $NO_2$ can be absorbed thereon and, since it is a powerful oxidizing agent, can initiate the combustion of the activated carbon after accumulation, over time, of significant amounts of $NO_2$. It should be noted that if the gas contains NO and oxygen, the oxidation reaction of NO may be catalyzed by the adsorbent itself.

It should be noted that other adsorbents that aim to stop the mercury have the property of being non-combustible (for example sulfur deposited on an alumina support), nevertheless they all have a reduced effectiveness for stopping the mercury due to the presence of $NO_2$ which is co-adsorbed and blocks the active sites.

SUMMARY OF THE INVENTION

Cooling to a temperature in the vicinity of −36° C. (around 2° C. above the triple point of mercury) in the first exchanger makes it possible to recover the most mercury possible before sending the fluid to be cooled in the second exchanger, which is better than stopping at −30° C. as in FR-A-2947329.

Embodiments of the invention are based on the behavior of mercury when it cools. According to one variant of the invention, in the zone of the brazed aluminum exchanger where the feed gas is found at temperatures above −38.6° C., the brazed aluminum exchanger is designed so as not to accumulate drops of mercury, having sloped passages, particular spacings of the corrugations in order to minimize the risks of trapping mercury, and no low point.

Particular solders for making the welds are used to prevent accelerated corrosion, even with traces of mercury (especially single-material welds). Exchanger manufacturers already offer brazed aluminum exchangers suitable for use in the presence of mercury ("All Heat Exchangers Are Not Created Equal", by Markussen, The Process Engineer, September 2004 and U.S. Pat. No. 6,492,040).

The advantage of this aspect is that it is possible to use a brazed aluminum exchanger, even in the presence of a lot of mercury. This is because the micro-drops formed during the condensation of the mercury cannot give rise to corrosion since they are present in amounts that are too small.

Specifically, the condensed mercury is discharged continuously, without possible accumulation.

The same exchanger design would be inoperative for the part of the exchange colder than −38.6° C. (234.29 K). This is because the mercury would be deposited in solid form in part at least on the walls. Even if a portion of the solid mercury is entrained in the gas, most is trapped on the walls. During a shutdown with reheating, the melting mercury would form large drops since the amount in play would correspond to the accumulation over a long period of the traces of mercury present in the gas phase below −38.8° C. A typical mercury concentration would be 0.35 $\mu g/Nm^3$ of gas at 22 bar absolute.

According to another embodiment of the invention, another approach is provided that consists in changing materials and/or type of exchanger for the exchanger operating at lower temperature. Stainless steel becomes suitable because it withstands low temperatures well.

For example, it is possible to use:
a stainless steel plate exchanger, in order to be able to benefit from cross-flow multi-fluid exchanges,
a "shell and tube" exchanger, well suited for exchanges between two fluids, and in the example given below, when most of the cold provided in the remainder of the process originates from the vaporization of a fluid. The loss of sensible heat exchanges in this part of the heat exchange does not impact the thermal performances very much since these sensible heats are above all used in the hottest part of the exchanger (before initiating the changes of state of the cooled gas). The flow area of the tubes is greater than in the case of a brazed fin exchanger,
other types of stainless steel exchangers (the "plate and shell" type in particular).

One advantage of this option is to avoid the use of adsorbent for stopping the mercury and to limit the use of a more expensive and/or less efficient exchanger having a reduced operating range. In addition, since the heat exchange in the second exchanger is smaller than in the first, the impact of using a second exchanger of more expensive manufacture and/or material is low as regards the price and the performance of the unit.

On the other hand, it is possible to combine this option with the use of an adsorption step upstream of the exchanger in order to remove a portion of the mercury.

After the zone hotter than −38.8° C., it is possible to eliminate the residual mercury using an adsorbent.

A first (or even the only) elimination of liquid mercury may be carried out in a liquid-gas separation pot, or in a liquid-gas direct contact column equipped with packing in order to improve the contact. A direct contact column is useful for ensuring the liquid phase of the mercury is stopped but other means may be envisaged: liquid/gas separation by cyclone, by deposition of solid mercury onto a plate (which is not made of aluminum) colder than −38.8° C., drainage of the gas, etc.

If the outlet temperature of this column is below that of the triple point of mercury, the mercury will be stopped therein even better since the drops of mercury will freeze and, since the vapor pressure drops, there is less mercury remaining in the gas phase.

The adsorbent may require the $NO_2$ and $N_2O_4$ to be removed from the gas. Stopping the $NO_2/N_2O_4$ in gaseous $CO_2$ is carried out well by washing with liquid $CO_2$, the column in question operates, for $CO_2$ at around 20 bar, at around −20° C. to −30° C. and therefore clearly satisfies the preceding points.

The adsorbent may require the gas to be heated, again, the use of brazed aluminum is possible since as the gas is being heated it will not deposit mercury. A compact exchanger is therefore possible again even though the gas contains mercury.

If the adsorbent can operate under temperature and composition conditions obtained after a first cooling down to a temperature above −38.6° C., then stopping the mercury will be much less expensive than in the conventional version (carried out at ambient temperature, without prior condensation of a portion of the mercury) for several reasons. Firstly, the amount of mercury to be stopped is reduced. At lower temperature, physical adsorption (or physisorption involving formation of van der Waals bonds) is favored, making it possible to increase the capacity of mercury stopped per kg of adsorbent when the latter operates on the basis of van der Waals bonds. Since the gas is at lower temperature, its volume flow rate is lower, for example its volume is reduced by 20% approximately at −38° C. relative to 35° C. Since the gas is dry, the adsorbent will age less. It is possible to dry the gas at ambient temperature, but difficult to stop the $NO_2$ and $N_2O_4$ therein.

According to one subject of the invention, a process is provided for cooling a flow containing at least 35% carbon dioxide and at least 0.2 μg/Nm³ mercury, the mercury being in liquid and/or gaseous form, wherein i) the flow is cooled in a first brazed aluminum plate exchanger from a first temperature to a second temperature above −38.6° C. in order to form a flow cooled to the second temperature, and ii) the flow cooled to the second temperature containing at least 35% carbon dioxide and at least 0.2 μg/Nm³ mercury or a gas derived from this cooled flow is cooled in a second exchanger made of stainless steel, copper, nickel, tantalum or an alloy of two of these metals, which is a shell and tube exchanger or a brazed plate-fin exchanger or a plate and shell exchanger, to a third temperature below −38.6° C., or iii) the flow cooled to the second temperature containing at least 35% carbon dioxide and at least 0.2 μg/Nm³ mercury is diphasic and is separated in a first phase separator in order to form the liquid mercury and a gas derived from the cooled flow that is purified of mercury.

Optionally the flow is partially condensed in the first exchanger and is sent to a first phase separator, the gaseous portion originating from the first phase separator constituting the gas derived from the cooled flow, this gaseous portion being less rich in mercury than the flow cooled in the first exchanger;

mercury is solidified and is deposited in the second exchanger and/or in a second phase separator supplied with mercury-enriched liquid or liquid mercury originating from the first phase separator;

the mercury does not solidify in the first phase separator;

the mercury does not solidify in the first heat exchanger;

the liquid originating from the first phase separator is sent to the second phase separator at a level below the liquid level thereof;

the second temperature is above −36° C.;

the second temperature is below −34° C., or even below −34.5° C.;

the third temperature is below −50° C.;

the third temperature is above −54° C.;

the cooled flow is not purified in order to eliminate mercury by adsorption between the first and second exchangers;

the cooled flow is not purified in order to eliminate mercury between the first and second exchangers;

the cooled flow is purified in order to eliminate mercury by adsorption at low temperature between the first and second exchangers;

the second exchanger is a brazed plate-fin exchanger made of stainless steel or copper, nickel or tantalum or an alloy of at least two of these metals;

the flow cooled to the third temperature is then separated at a temperature equal to or below the third temperature in order to produce a liquid flow containing at least 80% carbon dioxide, or even at least 95% carbon dioxide;

the cooled flow (or the gas derived from this flow) is cooled in the second exchanger in order to form a fluid, the fluid is sent to a (second) phase separator and the liquid formed in this phase separator is separated in a distillation column;

a liquid rich in carbon dioxide and originating from the distillation column may be vaporized in the second heat exchanger in order to produce a gas enriched in carbon dioxide.

According to another subject of the invention, an apparatus is provided for cooling a flow containing at least 35% carbon dioxide and at least 0.2 μg/Nm³ mercury, the mercury being in liquid or gaseous form, comprising a first brazed aluminum plate heat exchanger, a second heat exchanger made of stainless steel, copper, nickel, tantalum or an alloy of at least two of these metals, which is a shell and tube exchanger or a brazed plate-fin exchanger or a plate and shell exchanger, a duct for sending the flow to be cooled in the first exchanger from a first temperature to a second temperature above −38.6° C. in order to form a flow cooled to the second temperature, at least one duct for sending the flow cooled to the second temperature containing at least 35% carbon dioxide and at least 0.2 µg/Nm³ mercury to be cooled in the second exchanger to a third temperature below −38.6° C. or means for deriving a gas that is purified of mercury from this cooled flow and means for sending the gas thus derived to be cooled in the second exchanger to a third temperature below −38.6° C., means for sending a purge gas to the second exchanger and also means for discharging the mercury-laden purge gas from the second exchanger to a storage vessel or to a discharge stack and/or means for discharging a purge of liquid mercury from means for deriving the gas that is purified of mercury.

The first and/or the second phase separator is preferably made of stainless steel, copper, nickel or tantalum or an alloy of at least two of these metals.

The second phase separator is connected via a liquid duct to a distillation column according to certain variants. The distillation column is optionally made of aluminum or of stainless steel.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The flow may be gaseous or liquid.

The percentages mentioned in this document relating to purities are molar purities.

The flow may contain 45% carbon dioxide, 65% carbon dioxide or 85% carbon dioxide.

Preferably, the flow contains less than 20% methane.

Figure 1:
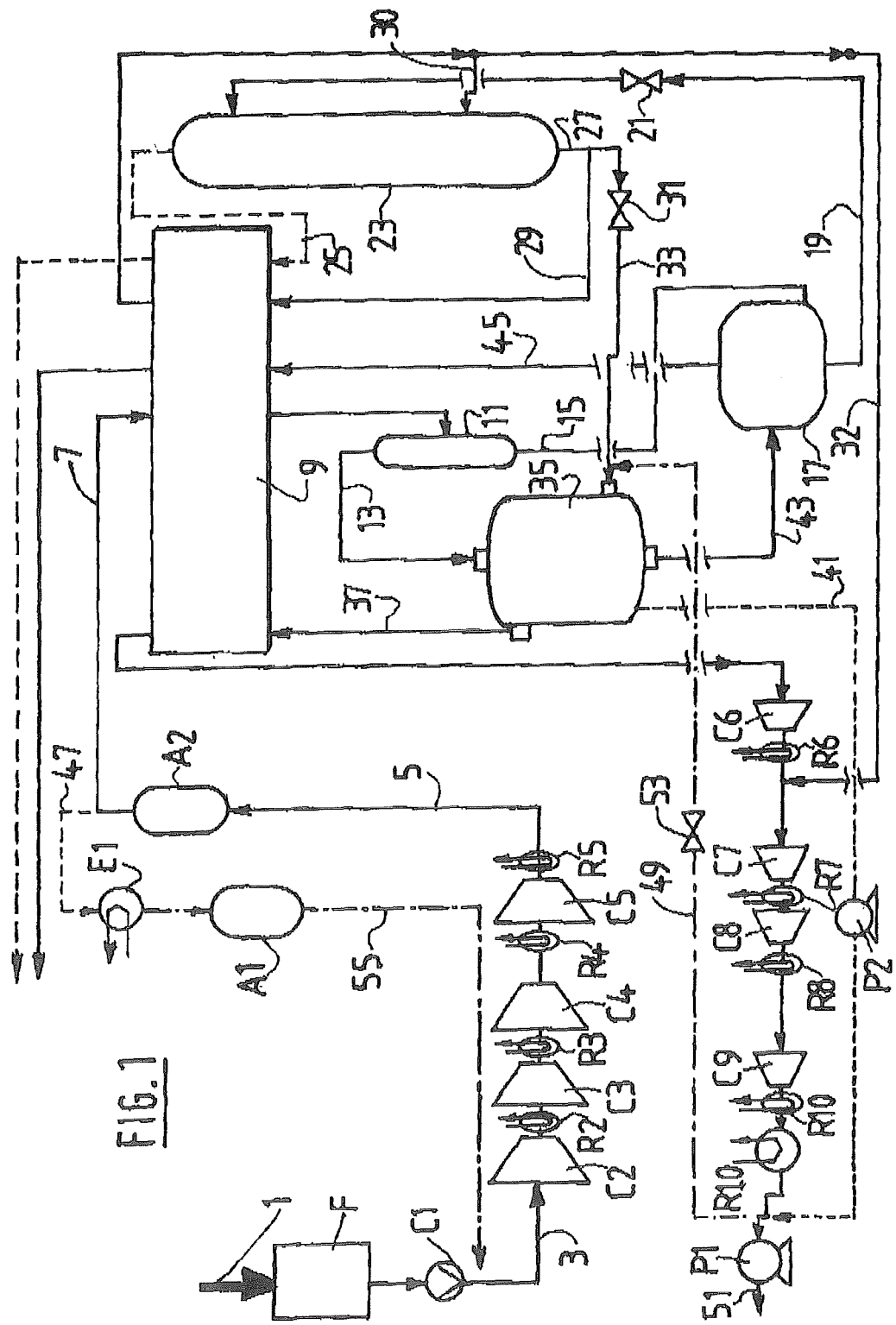
FIG. 1 provides an embodiment of the present invention.
Figure 2:
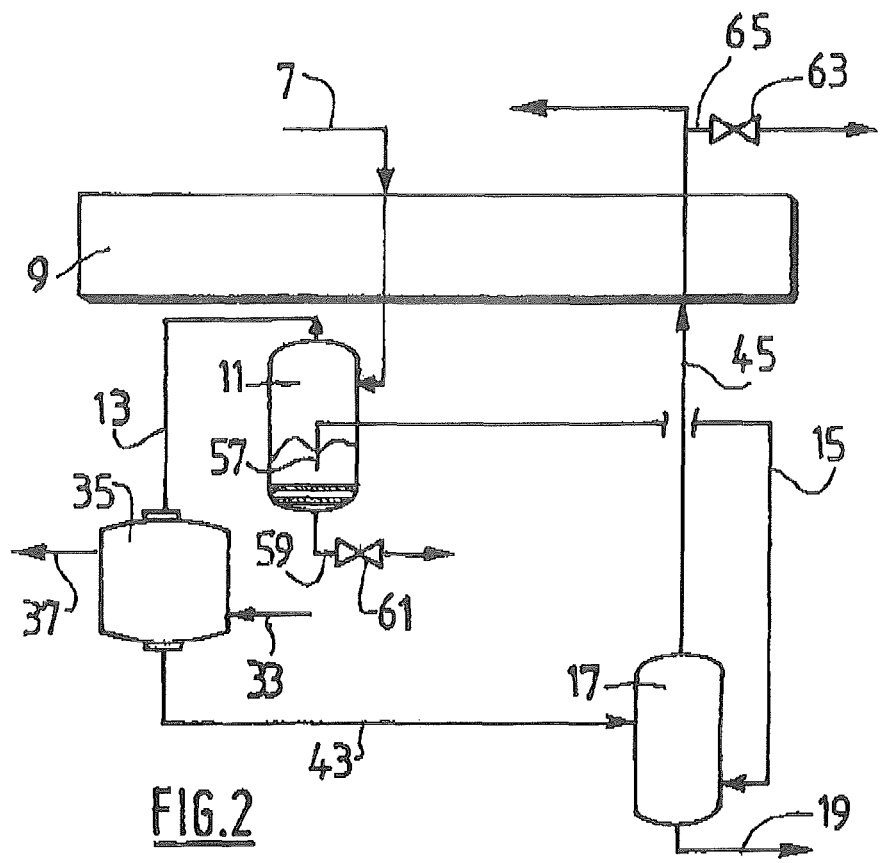
FIG. 2 provides an embodiment of the present invention.
Figure 3:
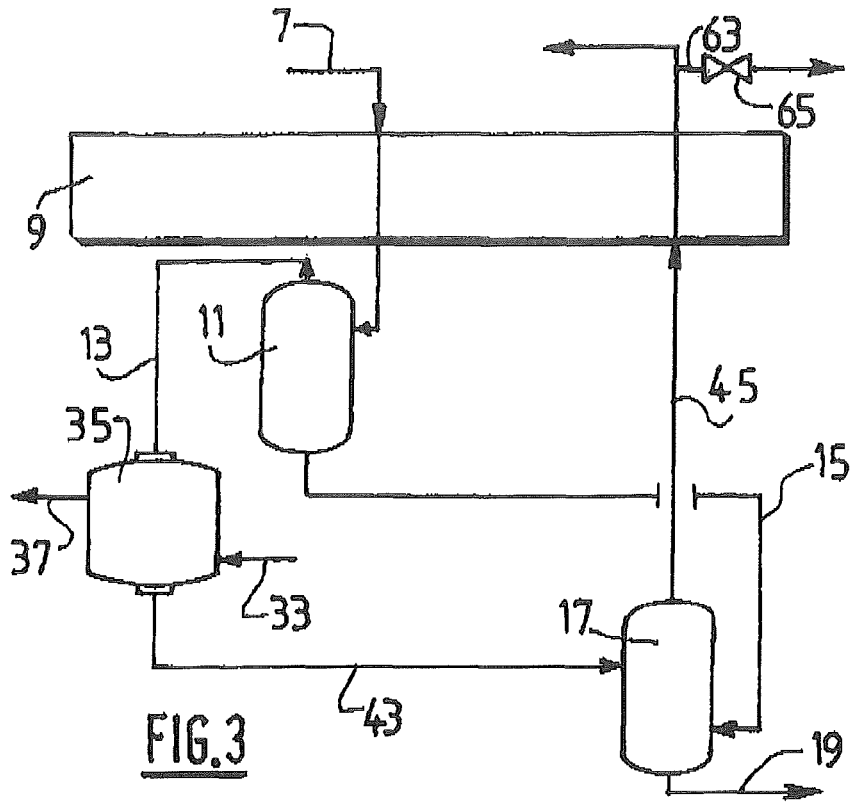
FIG. 3 provides an embodiment of the present invention.
Figure 4:
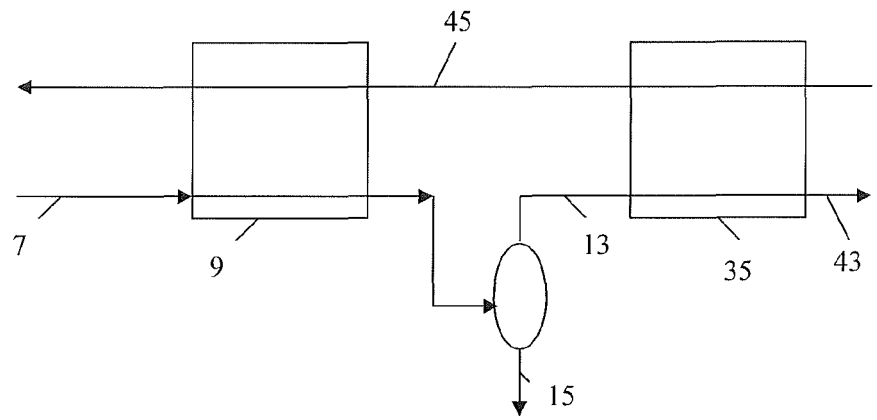
FIG. 4 provides an embodiment of the present invention.
Figure 5:
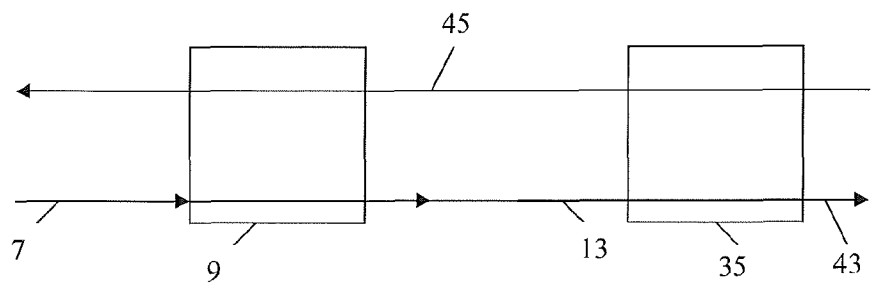
FIG. 5 provides an embodiment of the present invention.

Among other impurities, the flow may contain at least one of the following impurities: oxygen, nitrogen, argon, carbon monoxide, hydrogen. The invention will be described in greater detail by referring to the figures. FIG. 1 represents a variant of the process according to the invention, FIGS. 2 and 3 represent details from FIG. 1 and FIGS. 4 and 5 represent processes according to the invention.

In FIG. 1, a mixture 1 contains at least 35 mol % carbon dioxide, at least 60 mol % carbon dioxide, or even at least 80 mol % carbon dioxide. It contains at least 0.2 µg/Nm³ mercury, or even at least 2 µg/Nm³ mercury.

The remainder of the mixture 1 may contain one or more of the following components: oxygen, nitrogen, argon, nitrogen oxide (NO or $NO_2$ or $N_2O$), carbon monoxide, hydrogen, methane, etc.

The mixture is filtered in a filter F in order to remove the dust, then compressed in a first compressor stage C1 in order to form a compressed flow 3. The compressed flow 3 at 35° C. is compressed in a second compressor stage C2, cooled in a cooler R2, compressed in a third compressor stage C3, cooled in a cooler R3, compressed in a fourth compressor stage C4, cooled in a cooler R4, compressed in a fifth compressor stage C5 and cooled in a cooler R5 in order to form a flow 5 at between 6 and 20 bar abs. This flow of the mixture 5 is purified of water in a bed of adsorbent A2 in order to form a purified flow 7 at 35° C. The purified flow 7 is partially condensed in a first heat exchanger 9, which is an aluminum exchanger consisting of a stack of plates separated by fins. The partially condensed flow is sent at a temperature above −38.6° C., and below −34° C., or even below −34.5° C., for example at −35° C., to a first phase separator 11. In this first phase separator, the mercury is partially condensed and is purged with the liquid 15. The gas formed 13 in the phase separator 11 also contains at least 0.2 µg/Nm³ mercury and is sent to the tubes of a second heat exchanger 35, enabling an indirect exchange of heat between only two fluids, of shell and tube type. The figure does not illustrate the multiplicity of tubes where the gas 13 derived from the mixture is partially condensed. The liquid formed 43 at −52° C. is sent to a second phase separator 17, where the liquid 15 from the first phase separator 11 is also sent. The phase separators 11,17 will preferably be made of stainless steel. The stainless steel may be of 316L type. The ducts connecting the first phase separator to the second exchanger and connecting the first phase separator to the second phase separator will preferably be made of stainless steel. On the other hand, the structured packings of the column 23 may be made of aluminum.

Mercury solidifies in the second exchanger 35 which cools the flow 13 to a temperature below −38.6° C., preferably below −50° C. The cooling temperature is above −54° C. in order to prevent any risk of the carbon dioxide freezing.

Mercury also solidifies in the second phase separator 17.

A gas 45 from the second phase separator 17 is heated in the first heat exchanger.

The liquid 19 from the second separator 17 is expanded in a valve 21 and sent to the top of the distillation column 23.

An overhead gas 25 depleted in carbon dioxide but enriched in at least one of the impurities (oxygen, nitrogen, argon, nitrogen oxide (NO or $NO_2/N_2O_4$ or $N_2O$), carbon monoxide, hydrogen) is heated in the first heat exchanger 9.

A bottoms liquid 27 is withdrawn from the bottom of the column and contains at least 80 mol % carbon dioxide. The liquid 27 is divided into two, one flow 29 is vaporized in the first heat exchanger 9 without having been expanded. A portion 30 of the gas formed is sent to the bottom of the distillation column. The remainder 32 forms part of the product of the process.

The liquid 33 originating from the bottom of the column is expanded in a valve 31 up to a pressure equivalent to or slightly above that of the triple point of the carbon dioxide that it contains. The liquid is then sent to the shell of the second exchanger 35 where it is vaporized. The gas formed is heated in the exchanger 9 then is compressed by a compressor stage C6 and cooled in a cooler R6 before being mixed with the vaporized liquid 32. The gas thus formed is compressed by the stages C7, C8, C9 and cooled by the coolers R7, R8, R9, R10 in order to form a condensed gas. This condensed gas is mixed with the liquid purge 41 from the second exchanger and partly pumped by a pump P1 in order to form a pressurized liquid product 51, at at least 50 bar. The liquid purge 41 has previously been pumped in a pump P2. A portion 49 of the liquid is used as cycle liquid, is expanded at the triple point in the valve 53 and sent to the second exchanger 35, mixed with the flow 33.

A portion of the mixture 47 is heated in an exchanger E1 and is used to regenerate the adsorbent bed A1 which is in the regeneration phase. The flow 55, having been used for the regeneration, is mixed with the flow 3 downstream of the stage C1.

It is of course possible to vaporize the liquid 33 in the second exchanger 35 by indirect heat exchange with another fluid from the process, for example a portion of the vaporized bottoms liquid.

When the apparatus is shut down, a purge gas at more than −38.6° C. will be sent to the exchanger 35 in order to melt the solidified mercury and discharge it in gaseous form. These purge discharge ducts will be made of stainless steel.

The connection between the two phase separators 11,17 is problematic since it is necessary to prevent the mercury from freezing in the duct coming from the phase separator 11, in order to prevent it from blocking the duct, but to send all the same the liquid $CO_2$ coming from the phase separator 11 (at around −35° C.) below the liquid level of the phase separator 17 (which is at −52° C.). If it were introduced into the gaseous zone, solid mercury could be entrained by the gaseous fluid 45.

In order to avoid entraining liquid mercury with the fluid 19, it is possible to install a dip tube in order to withdraw the fluid 19 without withdrawing the mercury which will sink to the bottom of the separation pot 17.

Specifically, this makes it possible to reduce the portion of $CO_2$ lost in the gas phase at the inlet to this phase separator 17 (since the hotter liquid is cooled by the cold liquid) and to avoid sending or entraining mercury in the gas phase 45 which is emitted into the atmosphere.

TABLE 1

| flow | 3 | 7 | 13 | 43 |
|---|---|---|---|---|
| P (bar a) | 1 | 22 | 21.8 | 21.7 |
| T (° C.) | 35 | 35 | −35 | −52 |
| Composition (vol % on dry basis) | | | | |
| $CO_2$ | 78 | 78 | 61 | 61 |
| $O_2$ | 8 | 8 | 14 | 14 |
| Ar | 5 | 5 | 9 | 9 |
| $N_2$ | 9 | 9 | 16 | 16 |
| Mercury content ($\mu g/Nm^3$) | 3 | 3 | 0.5 | 0.03 |
| Note: | | | The remainder is condensed and is discharged in the liquid 15 | The remainder is trapped in the exchanger 35 |

In certain cases, it may prove that the simple partial condensation in the phase separator 11 is sufficient to remove enough mercury, that the gas 13 can be treated without taking additional precautions for protecting the components of the apparatus against the presence of mercury. In this case, it is not necessary to purge the exchanger 35 in order to remove the mercury, the latter being entrained in the liquid 15 toward the separator 17.

FIGS. 2 and 3 show, in greater detail, arrangement options for a part of FIG. 1. In both figures, a mixture 7 contains at least 35 mol % carbon dioxide, at least 60 mol % carbon dioxide, or even at least 80 mol % carbon dioxide. It contains at least 0.2 $\mu g/Nm^3$ mercury, or even at least 2 $\mu g/Nm^3$ mercury.

The remainder of the mixture 7 may contain one or more of the following components: oxygen, nitrogen, argon, nitrogen oxide (NO or $NO_2$ or $N_2O$), carbon monoxide, hydrogen, methane.

The mixture 7 is cooled in a first exchanger 9 which is a brazed aluminum plate-fin exchanger. The mixture is cooled to a temperature above −38.6° C. and below −34° C., or even below −34.5° C., and is sent to a first phase separator 11 made of stainless steel. The liquid produced 15 is removed from the phase separator and the gas 13 is sent to a second exchanger 35. This second exchanger 35 may be a shell and tube exchanger or a brazed plate-fin exchanger made of a metal other than aluminum or a plate and shell exchanger made of stainless steel. In the second exchanger 35, the flow is cooled to a third temperature below −38.6° C.

In the variant from FIG. 2, a portion of the mercury is liquefied in the first phase separator 11 which is made of stainless steel. As carbon dioxide is less dense than mercury, the liquefied carbon dioxide is found on top of mercury and may be removed by a dip tube 57 without removing the mercury. The liquid mercury can therefore be removed regularly via a duct 59 and a duct 61, or completely when the process is shut down. In this case, the mercury is not sent to the second phase separator 17, but is discharged from the apparatus and may be sold as product. The remainder of the mercury solidifies in the exchanger 35 and is removed by sending a purge gas into the exchanger 35 in order to vaporize the mercury and discharge it via the duct 63 and the valve 65.

For the variant from FIG. 3, the liquid mercury passes from the first phase separator 11 to the second phase separator 17 via the duct 15.

In this second pot, the mercury solidifies. During the shutdown of the process, the duct conveying the liquid from the second separator 17 to the column is closed, a purge gas vaporizes the mercury and the gas produced is purged via the duct 63 and the valve 65.

The use of a second dip tube (like 57 in FIG. 2) may be recommended for withdrawing the liquid 19 from separator 17.

In FIGS. 4 and 5, a mixture 7 contains at least 35 mol % carbon dioxide, at least 60 mol % carbon dioxide, or even at least 80 mol % carbon dioxide. It contains at least 0.2 $\mu g/Nm^3$ mercury, or even at least 2 $\mu g/Nm^3$ mercury.

The remainder of the mixture 7 may contain one or more of the following components: oxygen, nitrogen, argon, nitrogen oxide (NO or $NO_2$ or $N_2O$), carbon monoxide, hydrogen, methane.

The mixture 7 is cooled in a first exchanger 9 which is a brazed aluminum plate-fin exchanger. The mixture is cooled to a temperature above −38.6° C. and below −34° C., or even below −34.5° C., and is sent to a phase separator 11 made of stainless steel. The liquid produced 15 is removed from the phase separator and the gas 13 is sent to a second exchanger 35. This second exchanger 35 may be a shell and tube exchanger or a brazed plate-fin exchanger made of a metal other than aluminum or a plate and shell exchanger made of stainless steel. In the second exchanger 35, the flow is cooled to a third temperature below −38.6° C. and the mercury is deposited in solid form in the second exchanger.

The second exchanger 35 may be a brazed plate-fin exchanger made of stainless steel or copper, nickel or tantalum or an alloy of at least two of these metals.

Another fluid 45 is heated in both exchangers in order to provide frigories. Alternatively, two different fluids may each circulate in one of the exchangers. Next, the liquid formed 43 in the second exchanger may be treated in means that are sensitive to corrosion by mercury since the mercury concentration of the liquid will be less than 0.1 $\mu g/Nm^3$.

As illustrated in FIG. 5, the presence of the phase separator 11 is not essential.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A process for cooling a flow containing at least 35% carbon dioxide and at least 0.2 μg/Nm³ mercury, the mercury being in liquid and/or gaseous form, the process comprising the steps of:
   i) cooling the flow in a first brazed aluminum plate exchanger from a first temperature to a second temperature above −38.6° C. in order to form a cooled flow; and
   ii) cooling the cooled flow or a gas derived from said cooled flow in a second exchanger to a third temperature below −38.6° C. to form a second cooled flow, wherein the second exchanger is made of stainless steel, copper, nickel, tantalum or an alloy of two of these metals, wherein the second exchanger is a shell and tube exchanger or a brazed plate-fin exchanger or a plate and shell exchanger.

2. The process as claimed in claim 1, wherein the flow cooled to the second temperature containing at least 35% carbon dioxide and at least 0.2 μg/Nm³ mercury is diphasic and is separated in a first phase separator in order to form a liquid mercury and the gas derived from the cooled flow that is purified of mercury.

3. The process as claimed in claim 1, wherein the flow is partially condensed in the first exchanger and is sent to a first phase separator, the gaseous portion originating from the first phase separator constituting the gas derived from the cooled flow, this gaseous portion being less rich in mercury than the flow cooled in the first exchanger.

4. The process as claimed in claim 1, wherein mercury is solidified and is deposited in the second exchanger and/or in a second phase separator supplied with mercury-enriched liquid or liquid mercury originating from a first phase separator.

5. The process as claimed in claim 4, wherein a liquid originating from the first phase separator is sent to the second phase separator at a level below a liquid level thereof.

6. The process as claimed in claim 1, wherein the second temperature is above −36° C.

7. The process as claimed in claim 1, wherein the cooled flow is not purified in order to eliminate mercury by adsorption between the first and second exchangers.

8. The process as claimed in claim 7, wherein the cooled flow is not purified in order to eliminate mercury between the first and second exchangers.

9. The process as claimed in claim 1, wherein the second exchanger is a brazed plate-fin exchanger.

10. The process as claimed in claim 1, wherein the second cooled flow is then separated at a temperature equal to or below the third temperature in order to produce a liquid flow containing at least 80% carbon dioxide.

11. The process as claimed in claim 10, wherein the liquid flow comprises at least 95% carbon dioxide.

12. An apparatus for cooling a flow containing at least 35% carbon dioxide and at least 0.2 μg/Nm³ mercury, the mercury being in liquid or gaseous form, the apparatus comprising:
   a first brazed aluminum plate heat exchanger configured to receive the flow at a first temperature and cool the flow to a second temperature above −38.6° C. in order to form a cooled flow;
   a first phase separator for purifying the cooled flow of mercury thereby forming a gas stream having reduced amounts of mercury as compared to the cooled flow;
   a second heat exchanger made of stainless steel, copper, nickel, tantalum or an alloy of at least two of these metals, which is a shell and tube exchanger or a brazed plate-fin exchanger or a plate and shell exchanger, wherein the second heat exchanger is in fluid communication with the first phase separator such that the second heat exchanger is configured to receive the gas stream from the first phase separator and cool the gas stream to a third temperature below −38.6° C.;
   means for sending a purge gas to the second exchanger and also means for discharging a mercury-laden purge gas from the second exchanger to a storage vessel or to a discharge stack; and
   means for discharging a purge stream comprising liquid mercury from the first phase separator.

13. The apparatus as claimed in claim 12, wherein the second heat exchanger is a shell and tube exchanger.

14. The apparatus as claimed in claim 12, wherein the second heat exchanger is a brazed plate-fin exchanger.

15. The apparatus as claimed in claim 12, wherein the second heat exchanger is a plate and shell exchanger.

* * * * *